United States Patent
Ando (10) Patent No.: US 9,657,657 B2
(45) Date of Patent: May 23, 2017

(54) CONTROL DEVICE FOR IN-VEHICLE INTERNAL COMBUSTION ENGINE

(75) Inventor: Daigo Ando, Nagoya-shi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 625 days.

(21) Appl. No.: 13/880,174

(22) PCT Filed: Oct. 27, 2010

(86) PCT No.: PCT/JP2010/069063
§ 371 (c)(1),
(2), (4) Date: Apr. 18, 2013

(87) PCT Pub. No.: WO2012/056527
PCT Pub. Date: May 3, 2012

(65) Prior Publication Data
US 2013/0206105 A1    Aug. 15, 2013

(51) Int. Cl.
| | |
|---|---|
| *F02D 41/00* | (2006.01) |
| *F02D 13/02* | (2006.01) |
| *F01L 1/34* | (2006.01) |
| *F02D 41/30* | (2006.01) |
| *F02N 11/08* | (2006.01) |

(52) U.S. Cl.
CPC ............ *F02D 41/0002* (2013.01); *F01L 1/34* (2013.01); *F02D 13/02* (2013.01); *F02D 13/023* (2013.01); *F02D 13/0215* (2013.01); *F02D 13/0226* (2013.01); *F02D 41/30* (2013.01); *F02N 11/0825* (2013.01); *F01L 2800/01* (2013.01); *F01L 2800/03* (2013.01); *F01L 2800/11* (2013.01); *F02D 41/00* (2013.01);
(Continued)

(58) Field of Classification Search
USPC .................... 123/348, 345–347, 90.15, 90.12
See application file for complete search history.

(56) References Cited

U.S. PATENT DOCUMENTS

| | | | | |
|---|---|---|---|---|
| 2006/0102125 | A1* | 5/2006 | Mashiki | .................. F01L 1/352 123/179.4 |
| 2006/0102127 | A1 | 5/2006 | Izumi et al. | |

(Continued)

FOREIGN PATENT DOCUMENTS

| | | |
|---|---|---|
| JP | A-2005-233174 | 9/2005 |
| JP | A-2006-138299 | 6/2006 |

(Continued)

*Primary Examiner* — Mahmoud Gimie
(74) *Attorney, Agent, or Firm* — Oliff PLC (57) ABSTRACT

A control device, which is applied to an in-vehicle internal combustion engine equipped with an intake valve variable timing mechanism that varies the valve timing for an intake valve, and which intermittently operates the in-vehicle internal combustion engine by automatically stopping/restarting the engine, wherein the electronic control unit does not permit the engine operation to be automatically stopped when the intake valve variable timing mechanism malfunctions at an operating position closer to the advanced angle than the operating position for the most retarded angle of the variable range for the valve timing of intake valve, and thus preventing increased engine vibration and misfires when the engine automatically restarts, which are caused by a malfunction of the variable valve mechanism.

6 Claims, 4 Drawing Sheets

(52) U.S. Cl.
CPC ......... *F02D 2041/001* (2013.01); *Y02T 10/18* (2013.01); *Y02T 10/48* (2013.01)

(56) References Cited

U.S. PATENT DOCUMENTS

| | | |
|---|---|---|
| 2007/0251481 A1 | 11/2007 | Izumi et al. |
| 2009/0271095 A1* | 10/2009 | Kojima ............... F02N 11/0814 701/113 |
| 2010/0235067 A1* | 9/2010 | Nomura ................. F01L 1/344 701/103 |
| 2013/0206105 A1* | 8/2013 | Ando ........................ F01L 1/34 123/348 |

FOREIGN PATENT DOCUMENTS

| | | |
|---|---|---|
| JP | A-2006-144567 | 6/2006 |
| JP | A-2008-190495 | 8/2008 |
| JP | A-2009-074379 | 4/2009 |
| JP | A-2009-202662 | 9/2009 |
| JP | A-2010-031702 | 2/2010 |
| JP | A-2010-048194 | 3/2010 |

* cited by examiner

CONTROL DEVICE FOR IN-VEHICLE INTERNAL COMBUSTION ENGINE

TECHNICAL FIELD

The present invention relates to a controller that executes automatic stopping/restarting control for an engine operation when intermittently operating a vehicle internal combustion engine.

BACKGROUND ART

As known in the art, in a hybrid vehicle including two drive sources, an internal combustion engine and a motor, automatic stopping and automatic restarting of an engine operation are repeated when the vehicle is stopped or travelling. The automatic stopping and automatic restarting of the engine operation are repeatedly performed even in an internal combustion engine that performs a so-called economy running control that automatically stops the engine operation when stopping the vehicle such as when stopping at a traffic light or the like. In a vehicle that intermittently operates the vehicle internal combustion engine, it is desired that the engine vibration when restarting the engine be suppressed to an extent that the driver does not notice the restarting of the engine operation.

A variable valve actuation mechanism is applied to a vehicle internal combustion engine as a mechanism that varies the valve properties of engine valves (intake/exhaust valves). A variable valve timing mechanism for varying the valve timing of the engine valve, a variable actuation angle mechanism for varying the actuation angle of the engine valve, and the like are known variable valve actuation mechanisms.

Conventionally, a device described in patent document 1 is proposed as a controller for a vehicle internal combustion engine that includes a variable actuation angle mechanism and is mounted on a hybrid vehicle. In the vehicle internal combustion engine to which the controller described in the document is applied, to ensure the startability of the engine, the engine operation is restarted when the actuation angle of the engine valve is greater than the minimum actuation angle in the variable range. Thus, when the variable actuation angle mechanism becomes defective when the actuation angle of the engine valve is at the minimum actuation angle, a starting failure of the vehicle internal combustion engine may occur. Accordingly, the controller of the document prohibits automatic stopping of the engine operation so that a situation in which restarting cannot be performed is avoided if the variable actuation angle mechanism becomes defective when the actuation angle of the engine valve is at the minimum actuation angle.

PRIOR ART DOCUMENT

Patent Document

Patent Document 1: Japanese Laid-Open Patent Publication No. 2009-202662

SUMMARY OF THE INVENTION

Problems that the Invention is to Solve

Engine vibration that occurs when restarting the engine may be suppressed by retarding a valve closing timing of the intake valve to a middle period of a compression stroke by a variable valve timing mechanism to perform decompression and lower the actual compression ratio. In such a case, the engine operation is restarted when the valve timing of the intake valve is at a most retarded angle. In such a case, when the variable valve timing mechanism becomes defective at an operation position that is at an advanced side of the operation position (most retarded angle position) where the valve timing of the intake valve is at the most retarded angle, the reduction in the actual compression ratio when restarting the engine would be insufficient and thereby increase engine vibration even if the engine can be restarted.

The valve overlap of the intake/exhaust valves may increase and an interior EGR amount may increase depending on the advancement of the valve timing of the intake valve, the retardation of the valve timing of the exhaust valve, and the enlargement of the actuation angle of the intake/exhaust valves. Thus, when the variable valve timing mechanism or the variable actuation angle mechanism becomes defective when the valve overlap is large, the interior EGR amount becomes excessively large when restarting the engine operation. This may cause misfire and adversely affect emissions.

In such a manner, when the variable valve actuation mechanism becomes defective, depending on what is defective, the engine vibration when the engine is started becomes large even if the engine operation can be restarted. This may be discomforting to the driver, cause misfire, and adversely affect emissions.

When the engine and a vehicle shaft (drive shaft) are directly coupled in a mechanical manner, engine vibration is easily transmitted to a vehicle body, and an increase in the engine vibration during automatic restarting of the engine operation may become particularly troublesome.

Accordingly, it is an object of the present invention to provide a controller for a vehicle internal combustion engine capable of suitably avoiding at least one of the engine vibration during restarting becoming large when the variable valve actuation mechanism is defective and thereby discomforting the driver and the occurrence of misfire thereby adversely affecting emissions.

Means for Solving the Problems

To achieve the above problem, in the present invention, a controller for a vehicle internal combustion engine includes an intake variable valve timing mechanism that varies a valve timing of an intake valve, and the controller performs automatic stopping/restarting of an engine operation to intermittently operate the vehicle internal combustion engine. The controller includes an automatic stop prohibiting unit that prohibits automatic stopping of the engine operation when the intake variable valve timing mechanism is defective at an operation position located at an advanced side of a most retarded angle position where the valve timing of the intake valve is at a most retarded angle in its variable range.

In the vehicle internal combustion engine that performs the restarting of the engine operation when the valve timing of the intake valve is at the most retarded angle in order to suppress engine vibration when restarting the engine or suppress the occurrence of misfire, if the intake variable valve timing mechanism becomes defective at an operation position located at the advanced side of the most retarded angle position where the valve timing of the intake valve is at the most retarded angle in its variable range, the engine vibration caused by the restarting becomes large and discomforts the driver. As the valve timing of the intake valve advances, the valve overlap with the exhaust valve increases. This increases the interior EGR, and may consequently cause misfire and adversely affect emission. In this regard, in the present invention, the automatic stopping of the engine operation is prohibited by the automatic stop prohibiting unit when the intake variable valve timing mechanism becomes defective at such operation position. Accordingly, the present invention avoids, in a preferable manner, a defect in the variable valve actuation mechanism from causing at least one of an increase in the engine vibration during restarting thereby discomforting the driver and an occurrence of a misfire adversely affecting emission.

An increase in engine vibration and the occurrence of a misfire during restarting caused by a defect in the variable valve actuation mechanism become particularly prominent in a vehicle internal combustion engine in which the valve closing timing of the intake valve is retarded to the middle period of the compression stroke, and the actual compression ratio of the vehicle internal combustion engine during restarting is lowered when the intake variable valve timing mechanism is located at the most retarded angle position. The present invention is thus particularly effective when applied to a vehicle internal combustion engine including with such intake variable valve timing mechanism.

Furthermore, even when the intake variable valve timing mechanism becomes defective, the engine can be automatically restarted without any problem if the operation amount of the intake variable valve timing mechanism from the most retarded angle position to the operation position where the defect occurred is sufficiently small. Thus, even when the intake variable valve timing mechanism becomes defective, the frequency in which the automatic stopping of the engine operation is performed can be suppressed to minimum while suppressing the engine vibration and the occurrence of misfire during automatic restarting of the engine by configuring the automatic stop prohibiting unit to permit the automatic stopping of the engine operation if the operation amount of the intake variable valve timing mechanism from the most retarded angle position to the operation position where the defect occurred is smaller than or equal to the specified determination value.

The occurrence of misfire due to excessively large interior EGR during engine starting depends on the valve overlap amount of the intake/exhaust valves. Thus, even when the intake variable valve timing mechanism becomes defective at a position where the valve timing of the intake valve is advanced to a certain extent, the occurrence of misfire may be prevented if the valve timing of the exhaust valve is sufficiently advanced. The misfire may occur, however, even if the advanced angle amount of the valve timing of the intake valve at the time of defecting is small when the valve timing of the exhaust valve is at the retarded side. In the vehicle internal combustion engine that further includes an exhaust variable valve timing mechanism for varying the valve timing of the exhaust valve in addition to the intake variable valve timing mechanism, the automatic stop prohibiting unit is desirably configured in the following manner. The automatic stop prohibiting unit is desirably configured to prohibit the automatic stopping of the engine operation when the intake variable valve timing mechanism becomes defective and the operation amount of the intake variable valve timing mechanism from the most retarded angle position to the operation position where the defect occurred is greater than a specified determination value, and to variably set the value of the determination value according to the present valve timing of the exhaust valve. This minimizes the frequency during which automatic stopping of the engine operation is suppressed, while suppressing the occurrence of misfire during automatic restarting of the engine.

In addition to the intake variable valve timing mechanism, the vehicle internal combustion engine including the exhaust variable valve timing mechanism may reduce the interior EGR to suppress misfire during restarting by advancing the valve timing of the exhaust valve and reducing the valve overlap of the intake/exhaust valves. In this case, if the exhaust variable valve timing mechanism becomes defective at the operation position at the retarded side of the most advanced angle position where the valve timing of the exhaust valve is at the most advanced angle in its variable range, the interior EGR may not be sufficiently reduced. This may cause misfire and adversely affect the emission. In the vehicle internal combustion engine further including the exhaust variable valve timing mechanism in addition to the intake side valve timing mechanism, the automatic stop prohibiting unit may be configured to prohibit the automatic stopping of the engine operation when the exhaust variable valve timing mechanism becomes defective at such an operation position.

To achieve the above object, a further aspect of the present invention is a controller for a vehicle internal combustion engine including an exhaust variable valve timing mechanism that varies a valve timing of an exhaust valve. The controller performs automatic stopping/restarting of an engine operation to intermittently operate the vehicle internal combustion engine. The controller includes an automatic stop prohibiting unit that prohibits automatic stopping of the engine operation when the exhaust variable valve timing mechanism is defective at an operation position located at a retarded side of a most advanced angle position where the valve timing of the exhaust valve is at a most advanced angle in its variable range.

In the vehicle internal combustion engine including the exhaust variable valve timing mechanism, the internal EGR amount is reduced to suppress misfire during restarting by advancing the valve timing of the exhaust valve and reducing the valve overlap of the intake/exhaust valves. In such a case, when the exhaust variable valve timing mechanism becomes defective at an operation position at the retarded side of the most advanced angle position where the valve timing of the exhaust valve is at the most advanced angle in its variable range, the internal EGR amount is not sufficiently reduced. This causes a misfire and adversely affects the emission. In this regard, in the present invention, the automatic stop prohibiting unit prohibits the automatic stopping of the engine operation when the exhaust variable valve timing mechanism becomes defective at such an operation position. Accordingly, the present invention avoids, in a preferable manner, a defect in the variable valve actuation mechanism from causing a misfire that adversely affects emission.

Furthermore, even when the exhaust variable valve timing mechanism becomes defective, the engine can be automatically restarted without any problem if the operation amount of the exhaust variable valve timing mechanism from the most advanced angle position, at where the valve timing of the exhaust valve is at the most advanced angle of the variable range thereof, to the operation position where the defect occurred is sufficiently small. Thus, even when the exhaust variable valve timing mechanism becomes defective, the frequency in which the automatic stopping of the engine operation is performed can be suppressed to minimum while suppressing the occurrence of misfire during automatic restarting of the engine by configuring the automatic stop prohibiting unit to permit the automatic stopping of the engine operation if the operation amount of the exhaust variable valve timing mechanism from the most retarded angle position to the operation position where the defect occurred is smaller than or equal to the specified determination value.

To achieve the above object, a further aspect of the present invention is a controller for a vehicle internal combustion engine including a variable actuation angle mechanism that varies an actuation angle of an engine valve, wherein the controller performs automatic stopping/restarting of an engine operation to intermittently operate the vehicle internal combustion engine. The controller includes an automatic stop prohibiting unit that performs automatic restarting of the engine operation if the actuation angle of the engine valve is a minimum actuation angle in a variable range when the variable actuation angle mechanism is functioning normally, and prohibits automatic stopping of the engine operation when the variable actuation angle mechanism becomes defective at an operation position at where the actuation angle of the engine valve is greater than the minimum actuation angle.

In the vehicle internal combustion engine including such variable actuation angle mechanism, the internal EGR is reduced to suppress misfire during restarting by reducing the actuation angle and reducing the valve overlap of the intake/exhaust valves. In such a case, when the variable actuation angle mechanism becomes defective at the operation position where the actuation angle of the engine valve is greater than the minimum actuation angle of its variable range, the interior EGR is not sufficiently reduced. This causes a misfire adversely affects emission. In this regard, in the present invention, the automatic stop prohibiting unit prohibits the automatic stopping of the engine operation when the variable actuation angle mechanism becomes defective at such an operation position. Accordingly, the present invention avoids, in a preferable manner, a defect in the variable valve actuation mechanism from causing a misfire that adversely affects emission.

Furthermore, even when the variable actuation angle mechanism becomes defective, the engine can be automatically restarted without any problem if the operation amount of the variable actuation angle mechanism from the operation position at where the actuation angle of the engine valve is at the minimum actuation angle of its variable range to the operation position where the defect occurred is sufficiently small. Thus, even when the variable actuation angle mechanism becomes defective, the frequency in which the automatic stopping of the engine operation is performed can be suppressed to minimum while suppressing the occurrence of misfire during automatic restarting of the engine by configuring the automatic stop prohibiting unit to permit automatic stopping of the engine operation if the operation amount of the variable actuation angle mechanism from the operation position where the actuation angle of the engine valve is at the minimum actuation angle of its variable range to the operation position where the defect occurred is smaller than or equal to the specified determination value.

In a hybrid vehicle including two drive sources, the vehicle internal combustion engine and the motor, the stopping and restarting of the engine operation are repeatedly performed when the vehicle is stopped or travelling, and it is desirable that engine vibration caused by the restarting of the engine operation be suppressed to an extent that the engine vibration does not discomfort the driver. Since the restarting of the engine operation is often performed, the occurrence of misfire during restarting adversely affecting emission is particularly prominent in a hybrid vehicle. Thus, the present invention that avoids the engine vibration from increasing and discomforting the driver or the occurrence of a misfire adversely affecting emission during restarting due to a defect of the variable valve actuation mechanism is particularly preferable for application to the hybrid vehicle.

EMBODIMENTS OF THE INVENTION

First Embodiment

Figure 1:
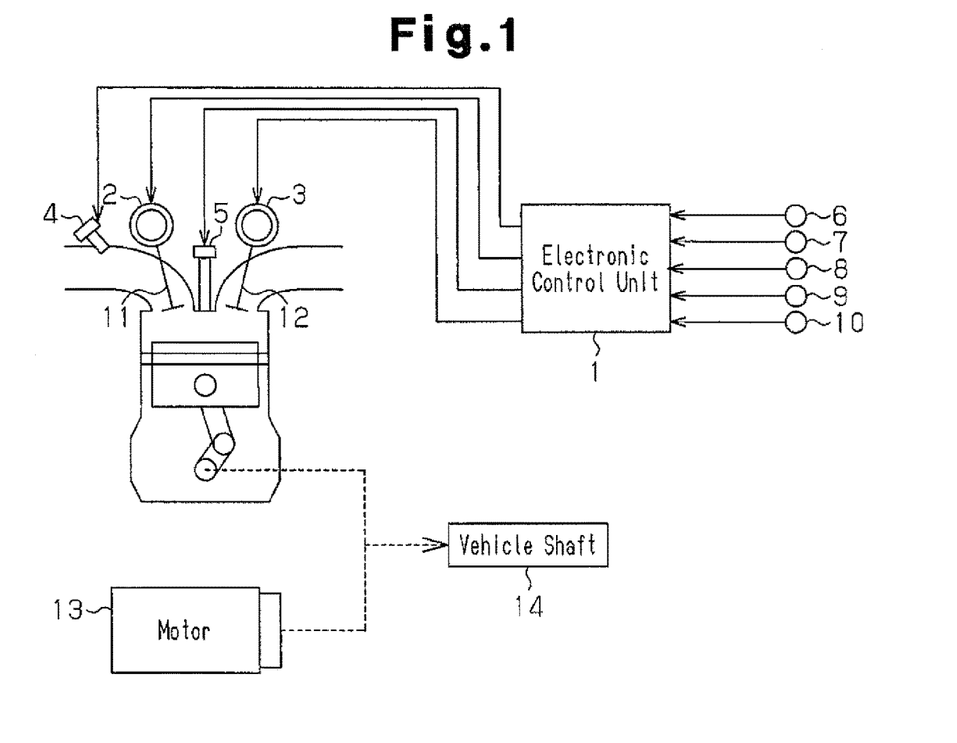
FIG. 1 is a schematic view showing the entire structure of a first embodiment of the present invention.

A first embodiment of a controller for a vehicle internal combustion engine of the present invention will now be described in detail with reference to FIGS. 1 to 3. As shown in FIG. 1, the present embodiment is applied to a hybrid vehicle that includes two drive sources, a vehicle internal combustion engine 15 and a motor 13. The vehicle internal combustion engine 15 is directly coupled to a vehicle shaft (drive shaft) 14 is a mechanical manner. The vehicle internal combustion engine to which the controller of the present embodiment is applied includes two mechanisms as a variable valve actuation mechanism, an intake variable valve timing mechanism 2 for varying the valve timing of an intake valve 11, and an exhaust variable valve timing mechanism 3 for varying the valve timing of an exhaust valve 12.

As shown in FIG. 1, the controller of the vehicle internal combustion engine 15 of the present embodiment is configured mainly by an electronic control unit 1 installed in the vehicle. The electronic control unit 1 includes a central processing unit (CPU), which performs various calculations related to vehicle control, and a read-only memory (ROM), which stores control programs and data. The electronic control unit 1 also includes a random access memory (RAM), which temporarily stores calculation results of the CPU, detection results of the sensor, and the like, and an input/output port (I/O), which functions as an interface that mediates input/output of signals with the exterior.

Drive circuits for various actuators arranged in the vehicle are connected to an output port of the electronic control unit 1. For example, the drive circuits for the intake variable valve timing mechanism 2, which varies the valve timing of the intake valve 11, the exhaust variable valve timing mechanism 3, which varies the valve timing of the exhaust valve 12, an injector 4, which injects and supplies fuel, an ignition plug 5, which ignites the fuel supplied to a cylinder of an internal combustion engine, and the like is connected to the output port of the electronic control unit 1.

Various types of sensors arranged in each unit of the vehicle are connected to an input port of the electronic control unit 1. For example, a vehicle speed sensor 6, which detects the vehicle speed, an NE sensor 7, which detects the engine rotation speed, an acceleration operation amount sensor 8, which detects the acceleration operation amount (e.g., depressing amount of acceleration pedal), an intake VT sensor 9, which detects the valve timing of the intake valve 11, an exhaust VT sensor 10, which detects the valve timing of the exhaust valve 12, and the like are connected to the input port of the electronic control unit 1.

In the present embodiment configured as described above, the electronic control unit I drives the intake variable valve timing mechanism 2 and the exhaust variable valve timing mechanism 3 in accordance with the engine operation situation to perform variable control on the intake valve 11 and the exhaust valve 12. FIG. 2 shows the transition of a valve lift curve of the intake valve 11 and the exhaust valve 12 in accordance with the varying of the valve timing.

Figure 2:
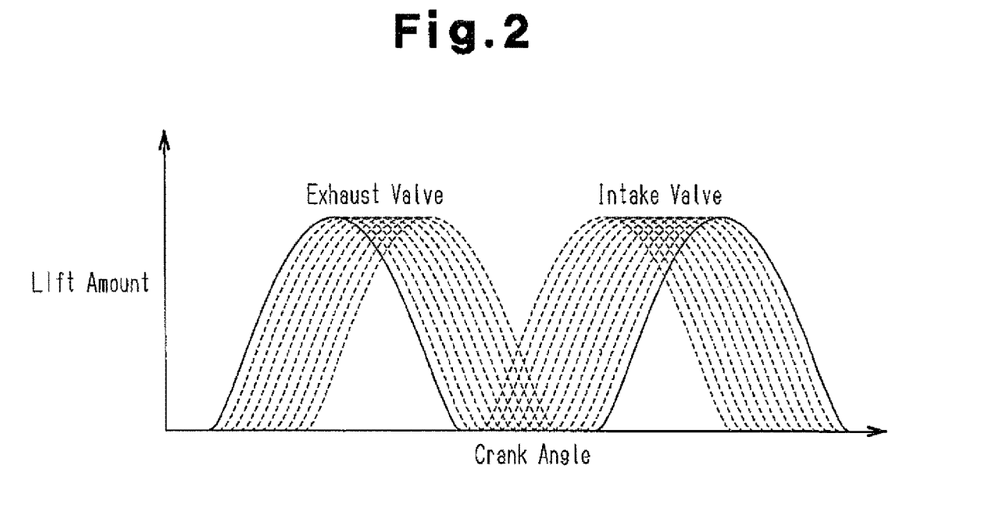
FIG. 2 is a graph showing the transition of a valve lift curve for an intake valve and an exhaust valve in the present embodiment.

In FIG. 2, the valve lift curve of the intake valve 11 and the exhaust valve 12 during engine starting is shown by a solid line. As shown in the drawing, the intake variable valve timing mechanism 2 during engine starting is located at an operation position where the valve timing of the intake valve 11 is at the most retarded angle in its variable range, that is, the most retarded angle position. This retards the valve closing timing of the intake valve 11 to a middle period in the compression stroke. In the vehicle internal combustion engine 15, the engine vibration during engine starting is suppressed by performing decompression and lowering the actual compression ratio by retarding the valve closing timing of the intake valve 11. The exhaust variable valve timing mechanism 3 during engine starting is located at an operation position where the valve timing of the exhaust valve 12 is at the most advanced angle in its variable range, that is, the most advanced angle position. In the vehicle internal combustion engine 15, the interior EGR is reduced and the occurrence of misfire during engine starting is suppressed by setting the valve overlap of the intake/exhaust valves to zero.

Furthermore, in the electronic control unit 1, the drive force distribution of the vehicle internal combustion engine 15 and the motor 13 is changed in accordance with the travelling situation of the vehicle. For example, motor travelling is performed when starting the vehicle and the like, and engine travelling is performed during stable driving of the vehicle and the like. Thus, in such a vehicle, intermittent operation of the engine operation, that is, automatic stopping and automatic restarting of the vehicle internal combustion engine 15 are repeatedly performed when the vehicle is stopped or travelling.

If the operation position of the intake variable valve timing mechanism 2 during engine starting cannot be shifted to the most retarded angle position due to a defect in the intake variable valve timing mechanism 2, such as fixation, sufficient decompression cannot be performed and the engine vibration during engine starting becomes large. Furthermore, if the operation position of the exhaust variable valve timing mechanism 3 during engine starting cannot be shifted to the most advanced angle position due to a defect in the exhaust variable valve timing mechanism 3, such as fixation, the interior EGR increases and the misfire may occur during engine starting. A defect of the variable valve timing mechanism may include fixation of a movable member inside a mechanism and biting of a sleeve of an oil control valve for controlling the drive hydraulic pressure of the variable mechanism.

In the present embodiment, if the intake variable valve timing mechanism 2 becomes defective at an operation position at the advanced side of the most retarded angle position at where the valve timing of the intake valve 11 is at the most retarded angle in its variable range, the automatic stopping of the engine operation is prohibited and the intermittent operation of the vehicle internal combustion engine 15 is prohibited. In the present embodiment, even when the exhaust variable valve timing mechanism 3 becomes defective at an operation position at a retarded side of the most advanced angle position where the valve timing of the exhaust valve 12 is at the most advanced angle in its variable range, the automatic stopping of the engine operation is prohibited and the intermittent operation of the vehicle internal combustion engine 15 is prohibited.

When the intake variable valve timing mechanism 2 becomes defective at the most retarded angle position or when the exhaust variable valve timing mechanism 3 becomes defective at the most advanced angle position, the restart can be performed without any problem. Thus, in such cases, the automatic stopping of the engine operation is not prohibited even when the variable valve timing mechanism is defective.

Figure 3:
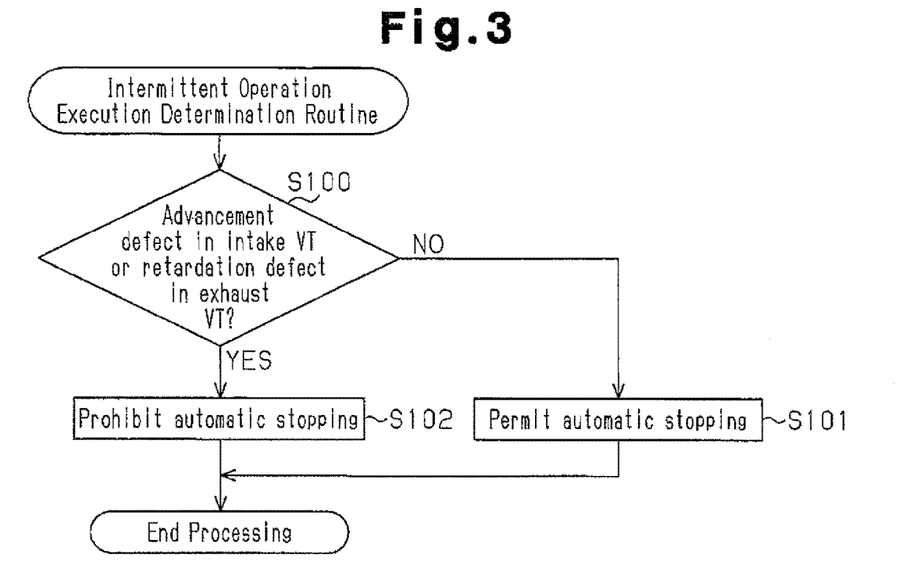
FIG. 3 is a flowchart of an intermittent operation execution determination routine in the present embodiment.

FIG. 3 shows a flowchart of an intermittent operation execution determination routine applied to the present embodiment. The processing of the present routine is repeatedly executed in cycles by the electronic control unit 1 when the vehicle is travelling.

When the present routine is started, in step S100, the electronic control unit 1 first checks whether or not there is an advancement defect in the intake variable valve timing mechanism 2 (intake VT) or a retardation defect in the exhaust variable valve timing mechanism 3 (exhaust VT). The advancement defect refers to a defect in the intake variable valve timing mechanism 2 at an operation position located at the advanced side of the most retarded angle position. The retardation defect refers to a defect in the exhaust variable valve timing mechanism 3 at an operation position located at the retarded side of the most advanced angle position.

If there are no defects (S100: NO), in step S101, the electronic control unit 1 permits automatic stopping of the vehicle internal combustion engine 15, that is, intermittent operation of the vehicle internal combustion engine 15, and then terminates the processing of the present routine. If one there is a defect in one of the mechanisms (S100: YES), the electronic control unit 1 prohibits the automatic stopping of the vehicle internal combustion engine 15, that is, the intermittent operation of the vehicle internal combustion engine 15 in step S102, and then terminates the processing of the present routine.

In the present embodiment, the electronic control unit 1 corresponds to an automatic stop unit in the present invention.

The controller of the vehicle internal combustion engine 15 of the present embodiment described above has the advantages described below.

(1) The controller of the vehicle internal combustion engine 15 of the present embodiment is applied to the vehicle internal combustion engine 15 including the intake variable valve timing mechanism 2 for varying the valve timing of the intake valve 11, and performs automatic stopping/restarting of the engine operation to intermittently operate the vehicle internal combustion engine 15. In the present embodiment, the electronic control unit 1 prohibits the automatic stopping of the engine operation when the intake variable valve timing mechanism 2 becomes defective at an operation position at the advanced side of the most retarded angle position where the valve timing of the intake valve 11 is at the most retarded angle in its variable range.

In the vehicle internal combustion engine 15 that restarts the engine operation when the valve timing of the intake valve 11 is at the most retarded angle to suppress the engine vibration during restarting, if the intake variable valve timing mechanism 2 becomes defective at the operation position at the advanced side of the most retarded angle position, engine vibration caused by the restarting becomes large and may discomfort the driver. As the valve timing of the intake valve 11 advances, the valve overlap with the exhaust valve 12 becomes large. This increases internal EGR and may consequently cause misfire and adversely affect emission. In this regard, in the present embodiment, the electronic control unit 1 prohibits the automatic stopping of the engine operation when the intake variable valve timing mechanism 2 becomes defective at such operation position. Therefore, when the intake variable valve timing mechanism 2, which is a variable valve actuation mechanism, is defective, the controller of the vehicle internal combustion engine 15 of the present embodiment avoids at least one of an increase in the engine vibration during restarting thereby discomforting the driver and the occurrence of a misfire adversely affecting the emission.

(2) The controller of the vehicle internal combustion engine 15 of the present embodiment is applied to the vehicle internal combustion engine 15, which includes the exhaust variable valve timing mechanism 3 for varying the valve timing of the exhaust valve 12 and which performs automatic stopping/restarting of the engine operation to intermittently operate the vehicle internal combustion engine 15. In the present embodiment, the electronic control unit 1 prohibits the automatic stopping of the engine operation when the exhaust variable valve timing mechanism 3 becomes defective at an operation position at the retarded side of the most advanced angle position where the valve timing of the exhaust valve 12 is at the most advanced angle in its variable range.

In the vehicle internal combustion engine 15 including the exhaust variable valve timing mechanism 3 for varying the valve timing of the exhaust valve 12, the internal EGR amount is reduced and misfire is suppressed during restarting by advancing the valve timing of the exhaust valve 12 and reducing the valve overlap of the intake/exhaust valves. In such a case, when the exhaust variable valve timing mechanism 3 becomes defective at the operation position located at the retarded side of the most advanced angle position, the internal EGR amount is not sufficiently reduced. This causes misfire and adversely affects the emission. In this regard, in the present embodiment, the electronic control unit 1 prohibits the automatic stopping of the engine operation when the exhaust variable valve timing mechanism 3 becomes defective at such an operation position. Accordingly, when the exhaust variable valve timing mechanism 3, which is the variable valve actuation mechanism in the present embodiment, becomes defective, a misfire does not occur and the emission is not adversely affected.

Second Embodiment

In the first embodiment, the automatic stopping of the vehicle internal combustion engine 15 is prohibited when the intake variable valve timing mechanism 2 becomes defective at an operation position other than the most retarded angle position. In the first embodiment, the automatic stopping of the vehicle internal combustion engine 15 is also prohibited when the exhaust variable valve timing mechanism 3 becomes defective at the operation position other than the most advanced angle position. However, depending on the operation position where the defect occurred, the automatic restarting of the engine may be performed while suppressing engine vibration and misfire to an extent they do not cause problems.

In the present embodiment, even when the intake variable valve timing mechanism 2 becomes defective, the automatic stopping of the engine operation is permitted if the operation amount of the intake variable valve timing mechanism 2 from the most retarded angle position to the operation position where the defect occurred is smaller than or equal to a specified determination value $\alpha$. Furthermore, in the present embodiment, even when the exhaust variable valve timing mechanism 3 becomes defective, the automatic stopping of the engine operation is also permitted if the operation amount of the exhaust variable valve timing mechanism 3 from the most advanced angle position to the operation position where the defect occurred is smaller than or equal to a specified determination value $\beta$.

The operation amount of the intake variable valve timing mechanism 2 from the most retarded angle position to the operation position where a defect occurred is obtained by the advanced amount of the valve timing of the intake valve 11 during the defect. The advanced amount refers to the varied amount of the valve timing using the valve timing of the intake valve 11 at the most retarded angle position in the variable range as a reference. The operation amount of the exhaust variable valve timing mechanism 3 from the most advanced angle position to the operation position where a defect occurred is obtained by the retarded amount of the valve timing of the exhaust valve 12 during the defect. The retarded amount refers to the varied amount of the valve timing using the valve timing of the intake valve 11 at the most advanced angle position in the variable range as a reference.

Figure 4:
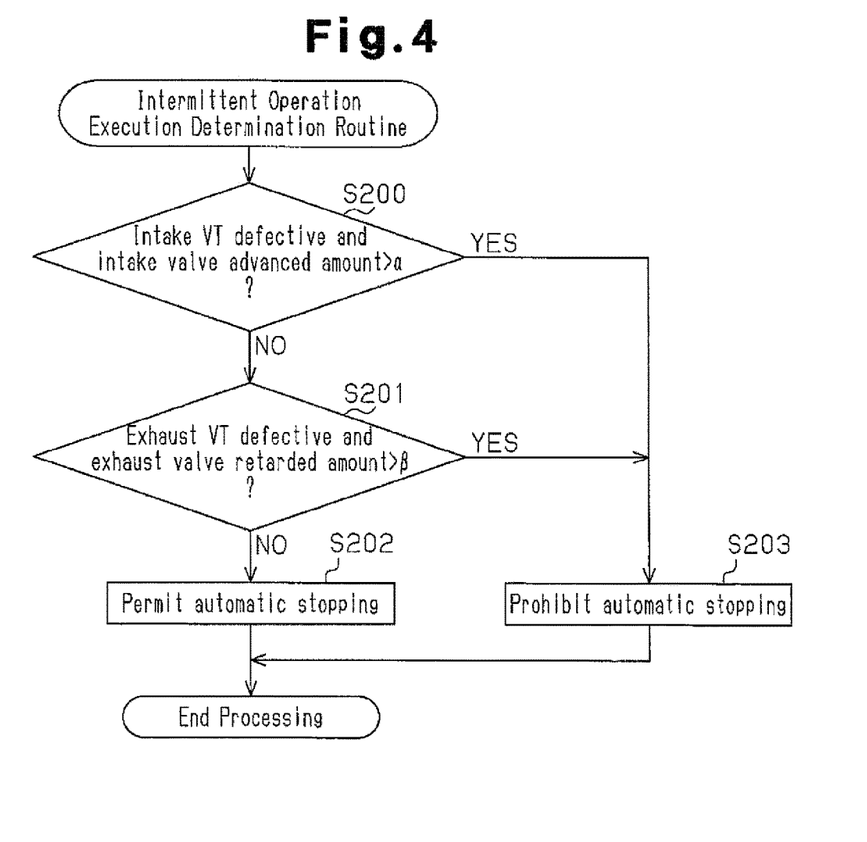
FIG. 4 is a flowchart of an intermittent operation execution determination routine in a second embodiment of the present invention.

FIG. 4 shows a flowchart of an intermittent operation execution determination routine applied in the present embodiment. The processing of this routine is repeatedly executed in cycles by the electronic control unit 1 when the vehicle is travelling.

When the present routine is started, the electronic control unit 1 first determines whether or not a defect occurred in the intake variable valve timing mechanism 2 (intake VVT) and the valve timing advanced amount (intake VT advanced amount) of the intake valve 11 is greater than the determination value $\alpha$ in step S200. In step S201, the electronic control unit 1 also determines whether or not a defect occurred in the exhaust variable valve timing mechanism 3 (exhaust VVT) and the valve timing retarded amount (exhaust VT retarded amount) of the exhaust valve 12 is greater than the determination value $\beta$.

When a negative determination is given in both steps S200 and S201 (S200: NO and S201: NO), in step S202, the electronic control unit 1 permits the automatic stopping of the vehicle internal combustion engine 15, that is, the intermittent operation of the vehicle internal combustion engine 15 and then terminates the processing of the present routine. When a positive determination is made in either one of steps S200 and S201 (S200: YES or S201: YES), in step S203, the electronic control unit 1 prohibits the automatic stopping of the vehicle internal combustion engine 15, that is, the intermittent operation of the vehicle internal combustion engine 15 and then terminates the processing of the present routine.

The present embodiment described above has the following advantage in addition to advantages (1) and (2).

(3) In the present embodiment, even when the intake variable valve timing mechanism 2 becomes defective, the automatic stopping of the engine operation is permitted if the operation amount of the intake variable valve timing mechanism 2 from the most retarded angle position, at where the valve timing of the intake valve 11 is at the most retarded angle in its variable range, to the operation position where the defect occurred is smaller than or equal to the specified determination value α. In the present embodiment, even when the exhaust variable valve timing mechanism 3 becomes defective, the automatic stopping of the engine operation is also permitted if the operation amount of the exhaust variable valve timing mechanism 3 from the most advanced angle position, at where the valve timing of the exhaust valve 12 is at the most advanced angle in its variable range, to the operation position where the defect occurred is smaller than or equal to the specified determination value β. Thus, the frequency in which the automatic stopping of the engine operation is performed is suppressed to minimum while suppressing the engine vibration and the occurrence of misfire during automatic restarting of the engine.

Third Embodiment

As described above, the occurrence of misfire caused by excessive internal EGR during engine starting depends on the valve overlap amount of the intake/exhaust valves. Thus, even when the intake variable valve timing mechanism 2 becomes defective at a position where the valve timing of the intake valve 11 is advanced to a certain extent, the occurrence of misfire can be suppressed if the valve timing of the exhaust valve 12 is sufficiently advanced. Furthermore, even when the advanced amount of the valve timing of the intake valve 11 is small, a misfire may occur if the valve timing of the exhaust valve 12 is at the retarded side.

In the present embodiment, the determination value α used to determine whether or not to prohibit the automatic stopping of the engine operation is variably set in accordance with the valve timing of the exhaust valve 12 at a given time. Specifically, a smaller value is set to the determination value α as the retarded amount of the valve timing of the exhaust valve 12 becomes greater.

Figure 5:
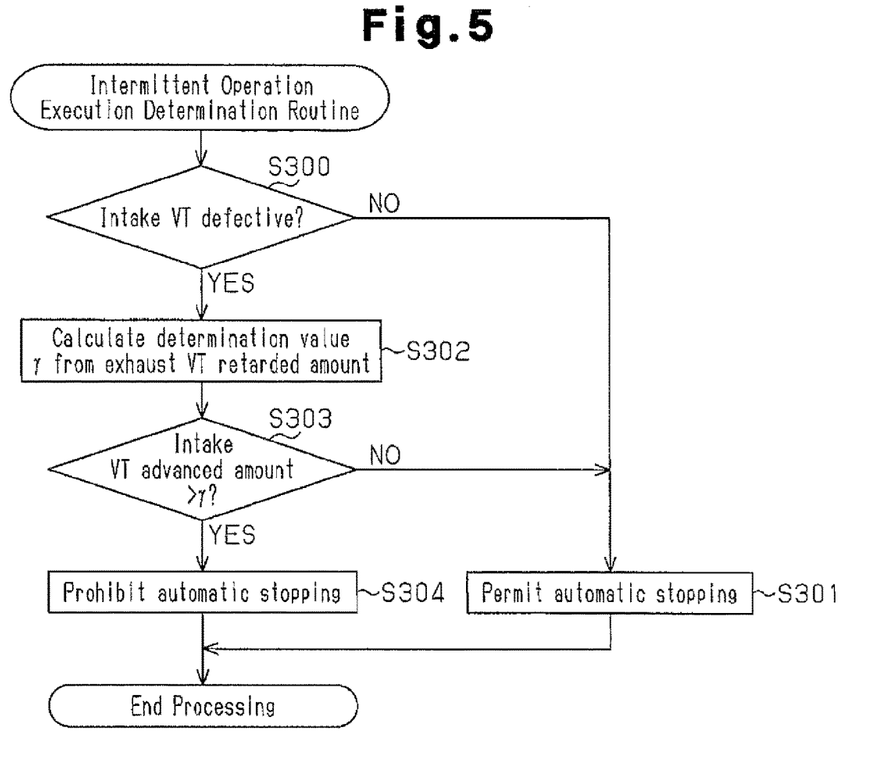
FIG. 5 is a flowchart of an intermittent operation execution determination routine in a third embodiment of the present invention.

FIG. 5 shows a flowchart of the intermittent operation execution determination routine applied in the present embodiment. The processing of the present routine is repeatedly executed in cycles by the electronic control unit 1 when the vehicle is travelling.

After the present routine is started, the electronic control unit 1 first checks whether or not a defect occurred in the intake variable valve timing mechanism 2 (intake VT) in step S300. If a defect has not occurred (S300: NO), in step S301, the electronic control unit 1 permits the automatic stopping of the vehicle internal combustion engine 15, that is, the intermittent operation of the vehicle internal combustion engine 15 and terminates the processing of the present routine.

If a defect has occurred, in step S302, the electronic control unit 1 calculates a determination value γ from the present valve timing retarded amount (exhaust VT retarded amount) of the exhaust valve 12. The determination value γ is decreased as the exhaust VT retarded amount increases.

Then, in step S303, the electronic control unit 1 determines whether or not the valve timing advanced amount (intake VT advanced amount) of the intake valve 11 in which the defect occurred is greater than the determination value γ. If the intake VT advanced amount is smaller than or equal to the determination value γ (S303) NO), in step S301, the electronic control unit 1 permits the automatic stopping of the vehicle internal combustion engine 15, that is, the intermittent operation of the vehicle internal combustion engine 15 and terminates the processing of the present routine. If the intake VT advanced amount is greater than the determination value γ (S303: YES), the electronic control unit 1 prohibits the automatic stopping of the vehicle internal combustion engine 15, that is, the intermittent operation of the vehicle internal combustion engine 15 in step S304, and terminates the processing of the present routine.

The present embodiment described above has the following advantage in addition to advantage (1).

(4) In the present embodiment, the automatic stopping of the engine operation is prohibited when a defect occurs in the intake variable valve timing mechanism 2 and the operation amount of the intake variable valve timing mechanism 2 from the most retarded angle position to the operation position where the defect occurred is greater than the specified determination value γ. In the present embodiment, the value of the determination value γ is variably set in accordance with the present valve timing of the exhaust valve 12. Thus, the frequency in which the automatic stopping of the engine operation is performed is suppressed to minimum while suppressing the occurrence of misfire at the time of automatic restarting of the engine.

Fourth Embodiment

Figure 6:
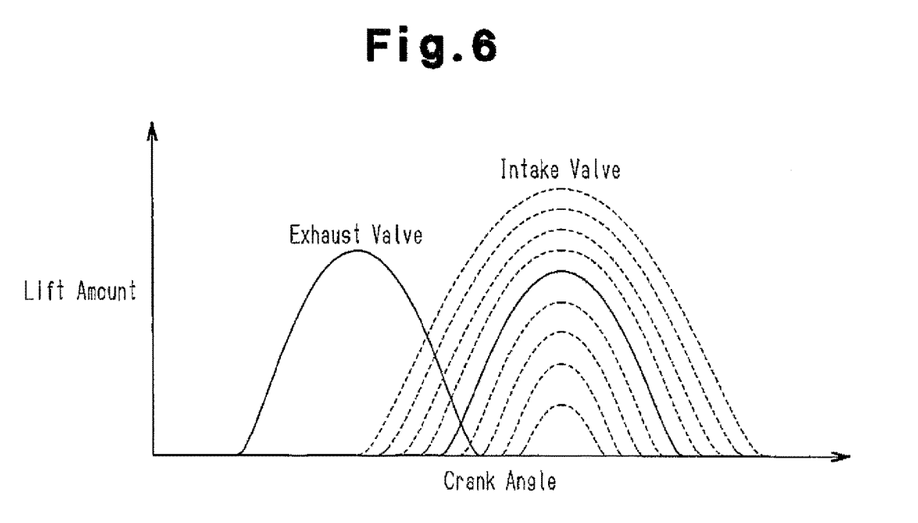
FIG. 6 is a graph showing the transition mode of a valve lift curve for an intake valve in a fourth embodiment of the present invention.

FIG. 6 shows an example of a known variable valve actuation mechanism applied to the vehicle internal combustion engine 15 in the form of a variable actuation angle mechanism that varies the actuation angle of the engine valve. FIG. 6 shows the transition of the actuation angle of the intake valve 11 when the actuation angle of the intake valve 11 is varied.

In the vehicle internal combustion engine 15 that includes such a variable actuation angle mechanism, the valve overlap amount of the intake/exhaust valves is reduced to suppress the internal EGR and suppress the occurrence of the misfire by performing automatic restarting of the engine operation when the actuation angle of the engine valve is the minimum actuation angle in its variable range. In such a case, if the variable actuation angle mechanism becomes defective at the operation position where the actuation angle of the engine valve is greater than the minimum actuation angle, the actuation angle of the engine valve at the time of the automatic restarting of the engine becomes greater than in a normal situation and the internal EGR becomes excessive. Hence, a misfire may occur.

In the present embodiment, the automatic stopping of the engine operation is prohibited when the variable actuation angle mechanism becomes defective at the operation position where the actuation angle of the engine valve is greater than the minimum actuation angle. In the present embodiment, even when the variable actuation angle mechanism becomes defective, the automatic stopping of the engine operation is permitted if the operation amount of the variable actuation angle mechanism from the operation position at where the actuation angle of the engine valve is the minimum actuation angle in the variable range to the operation position where the defect occurred is smaller than or equal to a specified determination value.

Figure 7:
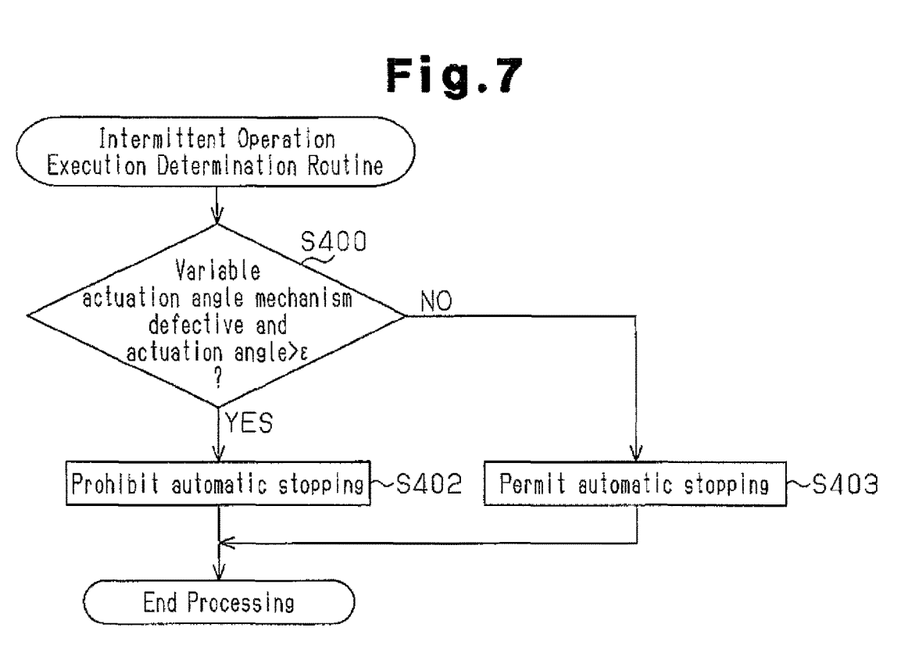
FIG. 7 is a flowchart of an intermittent operation execution determination routine in a fourth embodiment.

FIG. 7 shows a flowchart of an intermittent operation execution determination routine applied in the present embodiment. The processing of the present routine is repeatedly executed in cycles by the electronic control unit 1 when the vehicle is travelling.

After the present routine is started, the electronic control unit 1 first determines whether or not a defect occurred in the variable actuation angle mechanism and whether or not the present actuation angle is greater than a specified determination value $\epsilon$ in step S400. If a negative determination is given (S400: NO), in step S401, the electronic control unit 1 permits the automatic stopping of the vehicle internal combustion engine 15, that is, the intermittent operation of the vehicle internal combustion engine 15, and then terminates the processing of the present routine. If a defect occurred in the variable actuation angle mechanism and the actuation angle at the given time is greater than the specified determination value $\epsilon$ (S400: YES), in step S402, the electronic control unit 1 prohibits the automatic stopping of the vehicle internal combustion engine 15, that is, the intermittent operation of the vehicle internal combustion engine 15 and terminates the processing of the present routine.

The embodiment described above has the following effects.

(5) The controller of the vehicle internal combustion engine 15 according to the present embodiment is applied to the vehicle internal combustion engine 15, which includes the variable actuation angle mechanism for varying the actuation angle of the engine valve and performs the automatic stopping/restarting of the engine operation to intermittently operate the vehicle internal combustion engine 15. In the present embodiment, the electronic control unit 1 performs the automatic restarting of the engine operation with the actuation angle of the engine valve at the minimum actuation angle in its variable range when the variable actuation angle mechanism is functioning normally. Further, the electronic control unit 1 prohibits the automatic stopping of the engine operation when the variable actuation angle mechanism becomes defective at the operation position where the actuation angle of the engine valve is greater than the minimum actuation angle.

In the vehicle internal combustion engine 15 including the variable actuation angle mechanism, the internal EGR is reduced to suppress misfire during restarting by reducing the actuation angle and reducing the valve overlap of the intake/exhaust valves. In such a case, when the variable actuation angle mechanism becomes defective at the operation position where the actuation angle of the engine valve is greater than the minimum actuation angle, the interior EGR is not sufficiently reduced. This causes misfire and adversely affects emission. In this regard, in the present embodiment, the electronic control unit 1 prohibits the automatic stopping of the engine operation when the variable actuation angle mechanism becomes defective at such an operation position. Therefore, according to the present embodiment, a defect of the variable actuation angle mechanism, which is the variable valve actuation mechanism, does not result in a misfire that adversely affects the emission.

(6) In the present embodiment, even when the variable actuation angle mechanism becomes defective, the automatic stopping of the engine operation is permitted if the operation amount of the variable actuation angle mechanism from the operation position at where the actuation angle of the engine valve is the minimum actuation angle in the variable range to the operation position where the defect occurred is smaller than or equal to the specified determination value. Thus, the frequency in which the automatic stopping of the engine operation is performed is suppressed to minimum while suppressing the engine vibration and the occurrence of misfire during the automatic restarting of the engine.

The above embodiments may be modified as described below.

In the fourth embodiment, the automatic stopping of the engine operation is permitted even when the variable actuation angle mechanism becomes defective if the operation amount of the variable actuation angle mechanism from the operation position at where the actuation angle of the engine valve is the minimum actuation angle in the variable range to the operation position where the defect occurred is smaller than or equal to the specified determination value. If the occurrence of a misfire during automatic restarting of the engine resulting from a defect in the variable actuation angle mechanism is to be suppressed in an ensured manner, automatic stopping of the engine operation is prohibited if the variable actuation angle mechanism becomes defective at an operation position other than the operation position at where the actuation angle of the engine valve is the minimum actuation angle in the variable range.

In the third embodiment, the determination value $\epsilon$ is obtained in accordance with the valve timing retarded amount of the exhaust valve 12, and the automatic stopping of the engine operation is prohibited if the valve timing advanced amount of the intake valve 11 is greater than the determination value $\epsilon$. However, a similar determination can be made based on the valve overlap amount of the intake/exhaust valves. In other words, by determining whether or not to prohibit the automatic stopping of the engine operation from whether or not the present valve overlap amount is greater than the specified determination value when the defect in the intake variable valve timing mechanism 2 occurred, the frequency in which the automatic stopping of the engine operation is suppressed to minimum while suppressing the occurrence of misfire during automatic restarting of the engine.

In the first and second embodiments, the variable valve timing mechanism is arranged at both the intake side and the exhaust side, and the automatic stopping of the engine operation is prohibited in accordance with the content of the defect of either one of the mechanisms. However, the present invention may also be applied to a vehicle internal combustion engine in which the variable valve timing mechanism is arranged only at the intake side or the exhaust side.

In the embodiments described above, the present invention is applied to a vehicle internal combustion engine directly connected to the vehicle shaft in a mechanical manner. However, the present invention may be applied to a vehicle internal combustion engine having a different structure.

In the above embodiments, the controller of the present invention is applied to the vehicle internal combustion engine mounted on the hybrid vehicle including two drive sources, the vehicle internal combustion engine and the motor. However, the present invention may be applied in the same manner to vehicles other than the hybrid vehicle using internal combustion engines. For example, automatic stopping and automatic restarting of the engine operation are repeatedly performed even in an internal combustion engine that performs a so-called economy running control for automatically stopping the engine operation when stopping at a traffic light or the like. In such vehicle internal combustion engine, engine vibration that cannot be ignored may occur or a misfire may occur during automatic restarting of the engine depending on the content of defect of the variable valve actuation mechanism. Therefore, when the controller of the present invention is applied to such a vehicle internal combustion engine, engine vibration during restarting does not become large and does not discomfort the driver when the variable valve actuation mechanism is defective. Further, a misfire that adversely affects emission does not occur.

DESCRIPTION OF REFERENCE CHARACTERS 1 electronic control unit (automatic stop prohibiting unit)
2 intake variable valve timing mechanism 3 exhaust variable valve timing mechanism
4 injector
5 ignition plug
6 vehicle speed sensor
7 NE sensor
8 acceleration sensor
9 intake VT sensor
10 exhaust VT sensor
11 intake valve
12 exhaust valve
13 motor
14 vehicle shaft
15 vehicle internal combustion engine

The invention claimed is:

1. An electronic control unit for a vehicle internal combustion engine including an intake variable valve timing mechanism that varies a valve timing of an intake valve, the electronic control unit performing automatic stopping/re-starting of an engine operation to intermittently operate the vehicle internal combustion engine, the electronic control unit being configured to control the engine to:
    restart the engine operation at an operation position of the intake variable valve timing mechanism that is a most retarded angle position where the valve timing of the intake valve is at a most retarded angle in its variable range;
    prohibit automatic stopping of the engine operation when the intake variable valve timing mechanism is defective at an operation position located at an advanced side of the most retarded angle position; and
    permit the automatic stopping of the engine operation even when the intake variable valve timing mechanism becomes defective, as long as an operation amount of the intake variable valve timing mechanism from the most retarded angle position to an operation position where the defect occurred is smaller than or equal to a specified determination value.

2. The electronic control unit for the vehicle internal combustion engine according to claim 1, wherein:
    the vehicle internal combustion engine further includes an exhaust variable valve timing mechanism that varies a valve timing of an exhaust valve; and
    the electronic control unit is further configured to vary the determination value in accordance with the present valve timing of the exhaust valve.

3. The electronic control unit for the vehicle internal combustion engine according to claim 1, wherein the intake variable valve timing mechanism retards a valve closing timing of the intake valve to a middle period of a compression stroke when located at the most retarded angle.

4. The electronic control unit for the vehicle internal combustion engine according to claim 1, wherein the vehicle internal combustion engine is mounted on a hybrid vehicle including two drive sources, namely, the vehicle internal combustion engine and a motor.

5. The electronic control unit for the vehicle internal combustion engine according to claim 1, wherein the electronic control unit is further configured to:
    determine whether the operation amount of the intake variable valve timing mechanism from the most retarded angle position to the operation position where the defect occurred is smaller than or equal to the specified determination value; and
    prohibit the automatic stopping of the engine operation when determining that the operation amount of the intake variable valve timing mechanism from the most retarded angle position to the operation position where the defect occurred is greater than the specified determination value.

6. An electronic control unit for a vehicle internal combustion engine including an intake variable valve timing mechanism that varies a valve timing of an intake valve, the electronic control unit performing automatic stopping/re-starting of an engine operation to intermittently operate the vehicle internal combustion engine, the electronic control unit being configured to control the engine to:
    restart the engine operation at an operation position of the intake variable valve timing mechanism that is a most retarded angle position where the valve timing of the intake valve is at a most retarded angle in its variable range;
    determine whether the intake variable valve timing mechanism is defective at an operation position located at an advanced side of a determination position that is advanced from the most retarded angle position by a determination amount;
    prohibit automatic stopping of the engine operation when determining that the intake variable valve timing mechanism is defective at the operation position located at the advanced side of the determination position; and
    permit the automatic stopping of the engine operation when determining that the intake variable valve timing mechanism is defective at an operation position within a range from the most retarded angle position to the determination position.

* * * * *